DE NARD W. B. YOUNG.
METHOD OF RAPIDLY AGING SOLIDIFIED PLASTIC ARTICLES.
APPLICATION FILED DEC. 7, 1915.

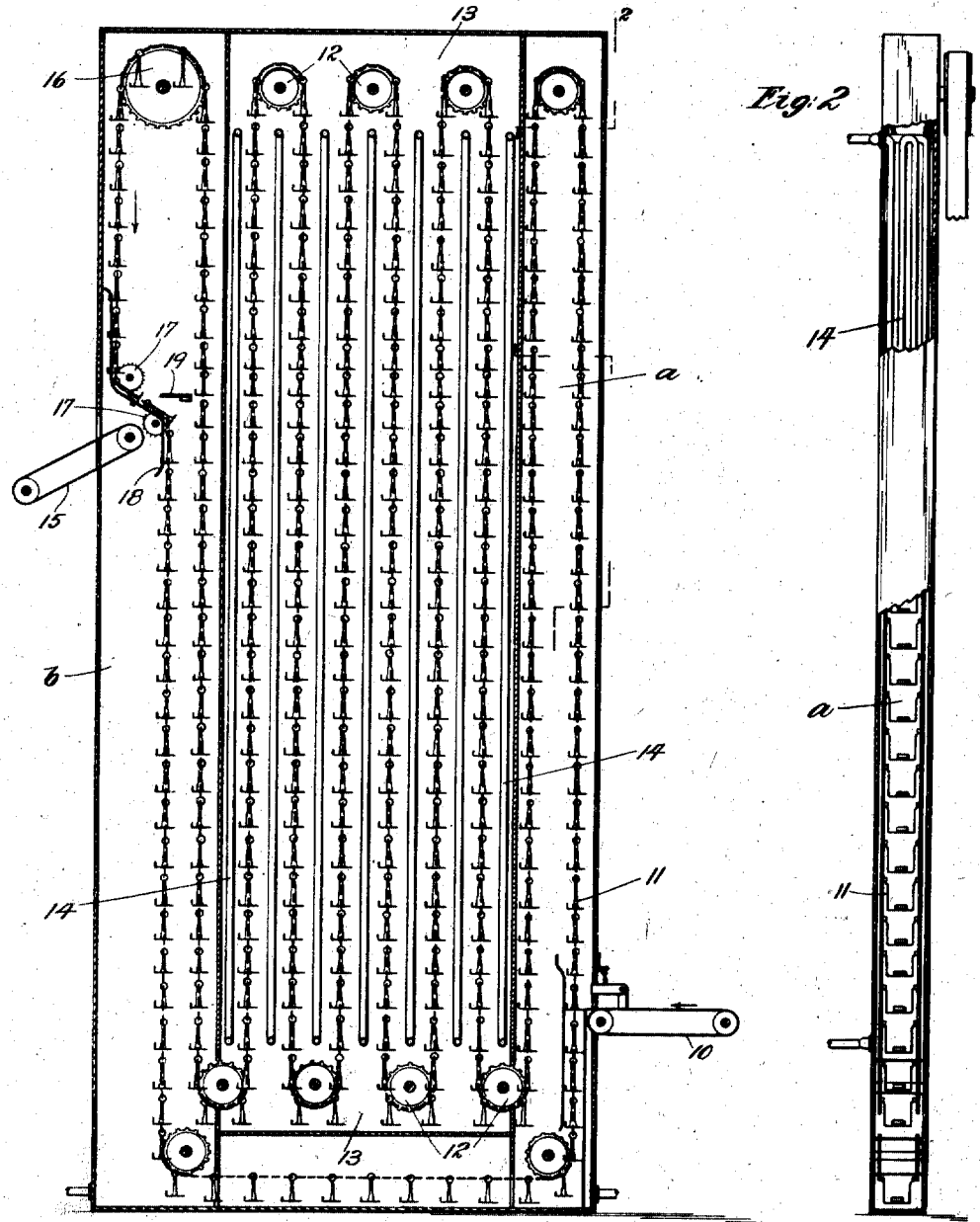

1,250,540.

Patented Dec. 18, 1917.
3 SHEETS—SHEET 2.

WITNESSES:

INVENTOR.
De Nard W. B. Young.
BY
ATTORNEY.

DE NARD W. B. YOUNG.
METHOD OF RAPIDLY AGING SOLIDIFIED PLASTIC ARTICLES.
APPLICATION FILED DEC. 7, 1915.

1,250,540.

Patented Dec. 18, 1917.
3 SHEETS—SHEET 3.

UNITED STATES PATENT OFFICE.

DE NARD W. B. YOUNG, OF NARBERTH, PENNSYLVANIA, ASSIGNOR TO SOAP WORKS EQUIPMENT COMPANY, A CORPORATION OF PENNSYLVANIA.

METHOD OF RAPIDLY AGING SOLIDIFIED PLASTIC ARTICLES.

1,250,540.

Specification of Letters Patent.  Patented Dec. 18, 1917.

Application filed December 7, 1915.  Serial No. 65,630.

*To all whom it may concern:*

Be it known that I, DE NARD W. B. YOUNG, a citizen of the United States, residing at Narberth, in the county of Montgomery and State of Pennsylvania, have invented a certain new and useful Method of Rapidly Aging Solidified Plastic Articles, of which the following is a specification.

The present invention, broadly stated, relates to a method of rapidly aging solidified plastic articles and has more particular relation to the rapidly aging of bars, blocks or cakes of soap, and while the herein disclosed method is applicable to the rapid aging of other solidified plastics, it is particularly fitted for the treatment of what is termed in the trade bar-soap and for illustrative purposes, the following description will be restricted thereto.

In the manufacture of bar-soap, as now practised, the soap is first molded, then cut into slabs and finally cut into elongated bars and placed upon racks where the soap remains for days at a time to dry or age, the length of time depending a great deal upon existing weather conditions. The bars of soap thus dried or aged are then cut into proper sized cakes for commercial use. As thus manufactured, bar-soap is commercially unsatisfactory for a number of reasons. For instance, by permitting soap to stand for long periods of time, as above described, it develops a surface efflorescence or formation of fine, white, salt crystals. Further, undue penetration of dryness takes place thus causing shrinkage of soap and resultant loss of weight. Still further, the bars of soap often become distorted or misshaped through long standing and perfume used for scenting the soap rapidly exudates. These and other disadvantageous results all tend to render the method now practised exceedingly slow, unsatisfactory and expensive.

This invention has for its principal object to overcome the above recited disadvantageous features and provide a method of aging bar-soap by which a more commercially valuable product is obtained than is now upon the market in a much more rapid manner and at considerable less expense. A further object of the present invention is to provide a method of rapidly aging bar-soap by which a superficial, uniform and translucent film or skin, free of visible crystalline salts is provided for said soap. A further object of the present invention is to provide a method of rapidly aging bar-soap by which the shape, weight and vapor or moisture containing properties of the soap are appreciably unchanged. A further object of the present invention is to provide a method of rapidly aging bar-soap in a continuous and uninterrupted manner, by which soap after being molded is first cut into slabs, then cut into bars, blocks or cakes and immediately treated according to the herein described process so that within a few minutes subsequent to being slabbed, the soap is ready for stamping, wrapping or shipment as desired. A further object of the present invention is to provide a method by which rapid exudation of perfume from the soap is retarded during aging. With these and various other objects in view, the invention consists of the new and novel method hereinafter described and finally claimed.

The nature, characteristic features and scope of the invention will be more fully understood from the following description taken in connection with the accompanying drawings forming part hereof and in which:

Figure 1, is a view in central section of apparatus used in connection with my method of rapidly aging solidified plastic articles.

Fig. 2, is a view in section taken upon the line 2—2 of Fig. 1.

Figure 3:
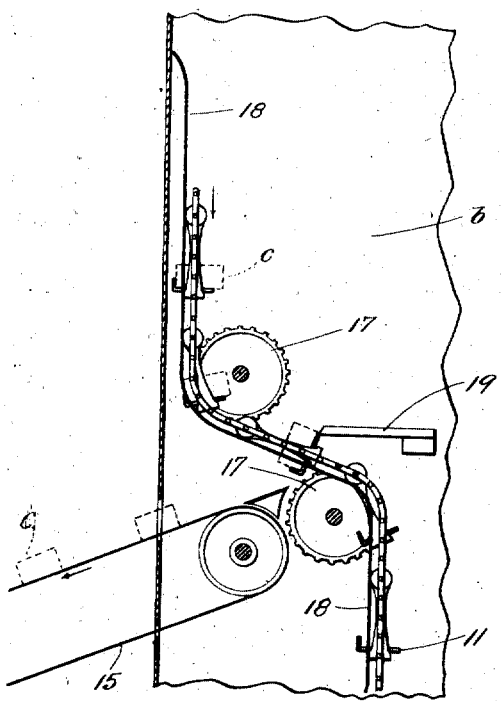
Fig. 3, is a fragmentary view in side elevation, drawn to an enlarged scale, of the delivery portion of the apparatus.
Figure 4:
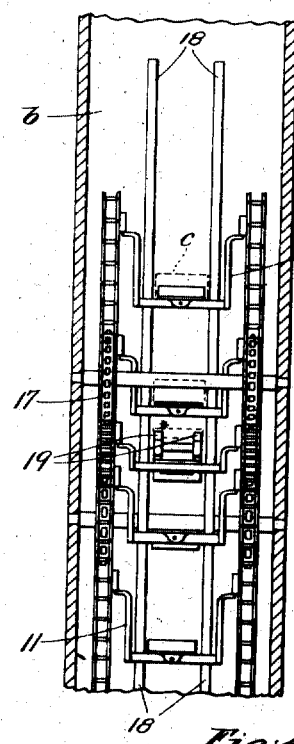
Fig. 4, is a similar view in end elevation thereof.
Figure 5:
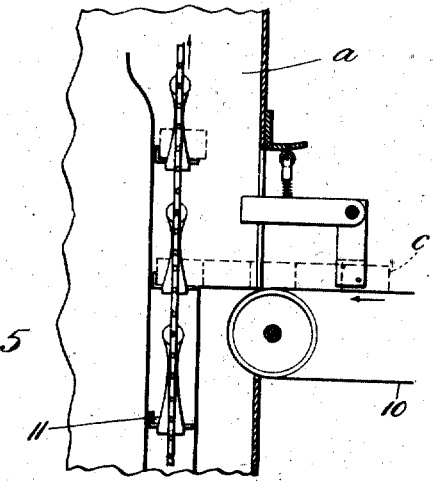
Fig. 5, is a similar view in side elevation of the feed portion of the apparatus.
Figure 6:
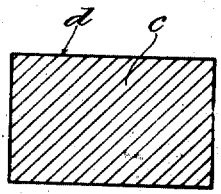
Fig. 6, is a view in section of the finished product.
Figure 7:
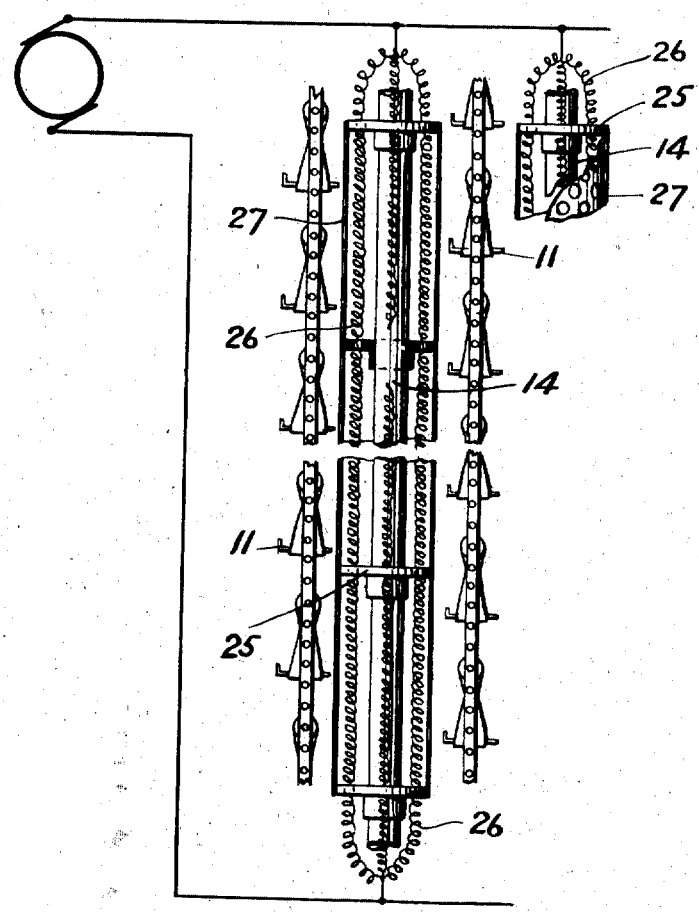
Fig. 7 is a fragmentary view, principally sectioned, illustrating a modified form of heating device.

For the purpose of illustrating my invention, I have shown in the above identified figures of the drawings, apparatus which is at present preferred by me for practising my method of rapidly aging bar-soap, since the same has been found in practice to give satisfactory and reliable results, although it is to be understood that my said method may be successfully practised with apparatus other than is herein shown and described.

In practising my method, soap is first molded as usual. It is then slabbed and immediately introduced to a cutting machine (not shown in the drawings) and cut into bars, blocks or cakes $c$. From the cutting machine the bar-soap is fed by means of a horizontal conveyer 10, directly to a vertically moving endless chain of free swinging soap-holders 11. The soap as fed to the conveyer 10, is of solidified plastic form, the surface of which is in a semi-crystalline, non-uniform condition. Furthermore, the soap is moist and is a source of vapor exteriorly and internally considered. It is of the essence of the present method that this vapor producing and moist condition be preserved. This is so that the soap retains its specific properties and original weight. To this end, I treat the soap to rapidly develop a superficial, uniform and translucent film or skin visibly free of crystalline salts and of infinitesimal thickness. Thus, while the soap surface is modified, the composition of the soap is not altered. The endless chain of soap-holders 11, travels over suitably mounted sprocket wheels 12, in a tortuous path and the soap-holders are so hung that they always maintain a horizontal position except at that portion of the apparatus where the finished product is discharged. With the feeding of the bars of soap to the endless chain of soap-holders, best results are obtained by causing the soap to first, pass upwardly and then downwardly through a space $a$, preferably inclosed, containing gaseous matter, for instance, air; to partially modify the surfaces of said bars of soap by absorbing therefrom a proper amount of surface moisture or vapor. The bars of soap next pass into and through a closed compartment 13, preferably constructed of insulating material possessed of non-heat conveying properties. Within this compartment 13, there is maintained a static body of air of elevated, constant temperature. For this purpose, steam, heated air, heated water or heated solutions or gases and the like may be passed through vertically disposed coils of pipe 14. This provides a closed heating system and the coils are so disposed that each run of the endless chain of soap-holders 11, passes between adjacent coils. Thus not only do the bars, blocks or cakes of soap move through a still body of heated air but in addition pass in immediate juxtaposition to the heating medium itself for the greater part of their travel through said compartment. It may be here observed that I have in mind the electrical heating of said compartment 13. For this purpose and for the sake of illustration the steam pipes 14 may have secured thereto a series of spaced porcelain or other non-conducting disks 25 perforated for the passage therethrough of a multiplicity of coiled wires 26, electrically connected in desired manner to a source of electrical energy.

A perforated protecting hood 27 may be employed to surround each steam pipe thus equipped. In practice, the passage of soap through this static body of air, of elevated and constant temperature, is at a rate of speed proportionate to the shortest period of time to which soap may be subjected to a maximum heat of predetermined degree in order to secure the result desired under the present method. The temperature at which the static body of air is maintained may vary in accordance with the character of soap or other plastic article being aged. The temperature may generally stated, range between 150° and 220° Fahrenheit. In practice, best results have been obtained by maintaining the static body of air at a temperature of between 180° and 190° Fahrenheit. The result desired is that of developing a jelly-like investing integument $d$ of infinitesimal thickness. It is essential to secure this jelly-like envelop in the shortest possible time so that the specific properties and weight of the soap is not changed. The last step of my method is to pass the bars, blocks or cakes thus treated into and through a cooling atmosphere contained, preferably in a closed compartment $b$. The purpose of this last step is to fix the jelly-like, investing integument so that a permanent, translucent film or skin, free of visible crystalline salts results. Such soap-film or skin serves to prevent atmosphere penetration and further serves to prevent escape of internal moisture or vaporous matter. This film or skin also serves to retard the rapid exudation of perfume used in scenting the soap. The bars, blocks or cakes of soap are now ready to be discharged from the apparatus to a conveyer 15. Adjacent the conveyer 15, suitable devices may be employed for overturning individual bars of soap to cause the same to fall upon said conveyer. For this purpose the endless chain of soap-holders is caused to travel at an acute angle to the conveyer 15, by passing first over a large sprocket wheel 16, and thence, inwardly around smaller sprocket wheels 17. Guides 18, are present to insure the soap-holders 11, being bodily shifted so as to follow the run of the chain adjacent the latter sprocket wheels. A pair of fingers 19, are also present against which the individual bars, blocks or cakes abut and as the endless chain of soap-holders moves on its way, the bars, blocks or cakes are lifted from off a soap-holder 11, and are overturned so as to fall upon conveyer 15. As thus discharged from the apparatus, the soap is sufficiently cooled to permit ready handling. It may be here stated that the soap after discharge from the apparatus may be passed by conveyer 15, to a stamping or embossing machine, to a press or to a wrapping machine or the soap may be immediately packed. As regards stamping or embossing, the soap surface is admirably fitted by my process to readily accept suitable imprints. The same is true should it be desired to shape the soap in a press. As regards wrapping, it may be stated that the soap will not stick to its wrapper which commercially considered is an important item. It may be further stated that as discharged from the apparatus, the soap may be readily handled for any of the above purposes without becoming mis-shaped. It is to be further noted at this point that it is sometimes desirable to imprint or emboss upon the soap at the time of cutting the same into bars, blocks or cakes, a suitable name, design or the like. In such event, the soap so imprinted or embossed may be treated in accordance with the herein described method without deleterious effect upon the imprinted or embossed soap portions.

By the above described continuous and uninterrupted method, bar-soap is rapidly aged to provide a commercially valuable commodity in which while the surface thereof is modified, the body retains its original specific properties and weight, which is highly important in the trade. The superficial skin or film being free of visible crystalline salts enhances the appearance of the soap and said skin or film prevents penetration of moisture or vaporous matter to and consequent staining of a wrapper as is now a common fault.

It will now be apparent that I have devised a novel and useful method which embodies the features of advantage enumerated as desirable in the statement of the invention and the above description and while I have in the present instance shown and described the preferred embodiment thereof, which has been found in practice to give satisfactory and reliable results, it is to be understood that the same is susceptible of modification in various particulars without departing from the spirit or scope of the invention or sacrificing any of its advantages and that I have in mind the treating of plastic articles other than soap.

What I claim is:

1. The method of rapidly aging a previously manufactured solidified plastic article having semi-crystalline, non-uniform surfaces which consists in first subjecting the article to a body of air of elevated, constant temperature to develop therefor an investing integument of a jelly-like consistency and then subjecting the article to a cooling atmosphere to fix said investing integument, the resultant superficial film or skin being uniform, translucent and visibly free from crystalline salts.

2. The method of rapidly aging a previously manufactered solidified plastic article which consists in subjecting the article to a static body of air of elevated, constant temperature to develop an investing integument of a jelly-like consistency and then subjecting the article to a cooling atmosphere to fix said investing integument, the resultant superficial film or skin being uniform and translucent.

3. The method of rapidly aging a previously manufactured solidified plastic article which consists in moving in a continuous and uninterrupted manner the article, first, through a static body of air of elevated, constant temperature to develop an investing integument of a jelly-like consistency and then through a cooling atmosphere to fix said investing integument, the resultant superficial film or skin being uniform and translucent.

4. The method of rapidly aging a previously manufactured solidified plastic article which consists in first moving the same through gaseous matter to partially modify the article surfaces, next moving said article through a static body of air of elevated, constant temperature to develop an investing integument of a jelly-like consistency, and finally moving said article through a cooling atmosphere to fix said investing integument, the resultant superficial film or skin being uniform and translucent.

5. The method of rapidly aging a previously manufactured solidified plastic article having semi-crystalline, non-uniform surfaces, which consists in first subjecting the article to gaseous matter to partially modify said surfaces, next subjecting the article to a static body of air of elevated, constant temperature to develop an investing integument of jelly-like consistency and finally subjecting the article to a cooling atmosphere to fix said investing integument, the resultant superficial film or skin being uniform and translucent.

6. The method of rapidly aging a previously manufactured solidified plastic article having semi-crystalline, non-uniform surfaces which consists in conveying by a continuous and uninterrupted movement said article, first, through gaseous matter to partially modify its surfaces, next, through a static body of air of elevated, constant temperature to develop an investing integument of jelly-like consistency and finally through a cooling atmosphere to fix said investing integument, the resultant superficial film or skin being uniform and translucent.

7. The method of rapidly aging bar-soap, which consists in moving the same through a static body of air of elevated, constant temperature to develop an investing integument of a jelly-like consistency and then moving the soap through a cooling atmosphere to fix said investing integument, the resultant superficial film or skin being uniform and translucent.

8. The method of rapidly aging bar-soap having semi-crystalline, non-uniform surfaces which consists in moving the same through a static body of air of elevated, constant temperature to develop an investing integument of jelly-like consistency and then moving the same through a cooling atmosphere to fix said investing integument, the resultant superficial film or skin being uniform, translucent and visibly free of crystalline salts.

9. The method of rapidly aging bar-soap having semi-crystalline, non-uniform surfaces, which consists in conveying in a continuous and uninterrupted movement said soap, first, through gaseous matter to partially modify the soap surface, next, through a static body of air of elevated, constant temperature to develop an investing integument of jelly-like consistency and finally, through a cooling atmosphere to fix said investing integument, the resultant film or skin being uniform, translucent and visibly free of crystalline salts.

10. The method of aging a previously manufactured solidified plastic article which is a source of vapor and is moist internally and externally considered, which consists in subjecting the article to a body of air of elevated and constant temperature to rapidly develop a superficial, uniform film or skin therefor and then fixing such film or skin by subjecting the article to a cooling atmosphere, whereby the article surface is modified to the extent of rendering it less permeable to the escape of said vapor and moisture.

11. The method of rapidly aging a previously manufactured solidified plastic article which consists in subjecting the article to a body of air of elevated, constant temperature to develop an investing integument of a jelly-like consistency and then subjecting the article to a cooling atmosphere to fix said investing integument, the resultant superficial film or skin being uniform and translucent.

12. The method of aging a previously manufactured solidified plastic article which is a source of vapor, is moist and which contains dissolvable substances internally and externally considered, which consists in subjecting the article to a body of air of elevated and constant temperature to rapidly develop a superficial, uniform film or skin therefor and then fixing such film or skin by subjecting the article to a cooling atmosphere, whereby the article surface is modified to the extent of rendering it less permeable to the escape of said vapor, moisture and dissolvable substances.

In testimony whereof, I have hereunto signed my name.

DE NARD W. B. YOUNG

Witnesses:
WILLIAM J. JACKSON,
HELEN M. BYRNE.